(12) United States Patent
Hecht

(10) Patent No.: US 9,120,155 B2
(45) Date of Patent: Sep. 1, 2015

(54) TOOL HOLDER HAVING A TOOL BODY AND TOP CLAMP FOR RETAINING A CUTTING INSERT

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 264 days.

(21) Appl. No.: 13/957,193

(22) Filed: Aug. 1, 2013

(65) Prior Publication Data

US 2014/0161548 A1 Jun. 12, 2014

Related U.S. Application Data

(62) Division of application No. 12/783,993, filed on May 20, 2010, now abandoned.

(30) Foreign Application Priority Data

Jun. 1, 2009 (IL) .......................................... 199285

(51) Int. Cl.
*B23B 27/16* (2006.01)
*B23B 27/14* (2006.01)

(52) U.S. Cl.
CPC ........... *B23B 27/1625* (2013.01); *B23B 27/148* (2013.01); *B23B 27/164* (2013.01);
(Continued)

(58) Field of Classification Search
CPC .................. Y10T 407/2282; Y10T 407/2286; Y10T 407/2292; B23B 27/16; B23B 27/1666; B23B 27/1625; B23B 27/148
USPC .......................................... 407/107, 109, 112
See application file for complete search history.

(56) References Cited

U.S. PATENT DOCUMENTS 1,355,902 A * 10/1920 Fuller ........................... 407/107
5,100,268 A    3/1992 Nakayama et al.
(Continued)

FOREIGN PATENT DOCUMENTS

DE    40 33 072    4/1992
GB    902 193    7/1962
(Continued)

OTHER PUBLICATIONS

International Search Report in PCT/IL2010/000389, dated Sep. 20, 2010.

*Primary Examiner* — Sunil K Singh
*Assistant Examiner* — Ryan Rufo
(74) *Attorney, Agent, or Firm* — Womble Carlyle

(57) ABSTRACT

A cutting tool includes a cutting insert releasably retained therein. The cutting insert has top and bottom surfaces and a peripheral surface extending therebetween. The cutting insert does not include any clamping bore for receiving a clamping component therein. The cutting insert may having unitary, one-piece construction and be formed of a superabrasive material. The cutting insert may have a two-headed arrow shape, or similar shapes, such that the body of the cutting insert is small relative to the cutting regions thereof. The cutting tool includes a top clamp for clamping the cutting insert in an insert pocket. The top clamp has an asymmetrical shape and engages the cutting insert in one engagement region on the top surface, and in one engagement region on the peripheral surface. The cutting insert engages the insert pocket at the bottom surface, and in three spaced apart engagement regions on the peripheral surface.

17 Claims, 6 Drawing Sheets

(52) U.S. Cl.
CPC ....... *B23B27/1666* (2013.01); *B23B 2226/125* (2013.01); *B23B 2226/315* (2013.01); *Y10T 407/2268* (2015.01); *Y10T 407/2282* (2015.01); *Y10T 407/235* (2015.01); *Y10T 407/27* (2015.01)

(56) References Cited

U.S. PATENT DOCUMENTS

| | | | | |
|---|---|---|---|---|
| 8,491,231 | B2 * | 7/2013 | Edler et al. | 407/103 |
| 8,727,674 | B2 * | 5/2014 | Baca et al. | 407/107 |
| 2003/0086766 | A1 | 5/2003 | Andras | |
| 2005/0232711 | A1 * | 10/2005 | Shaheen | 407/107 |
| 2008/0112767 | A1 * | 5/2008 | Huang | 407/107 |
| 2010/0266353 | A1 | 10/2010 | Zitzlaff et al. | |
| 2011/0164933 | A1 * | 7/2011 | Park et al. | 407/107 |

FOREIGN PATENT DOCUMENTS

| | | |
|---|---|---|
| GB | 1 093 055 | 11/1967 |
| JP | 2004-042157 | 2/2004 |
| JP | 2006-116681 | 5/2006 |
| JP | 2008-260090 | 10/2008 |
| WO | 2009/047166 | 4/2009 |

\* cited by examiner

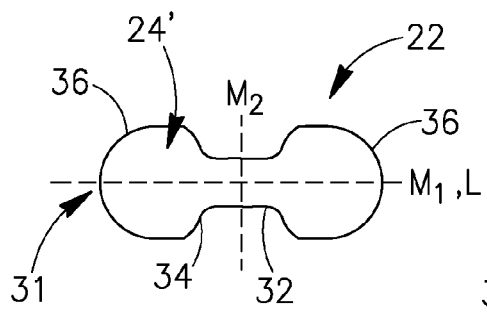 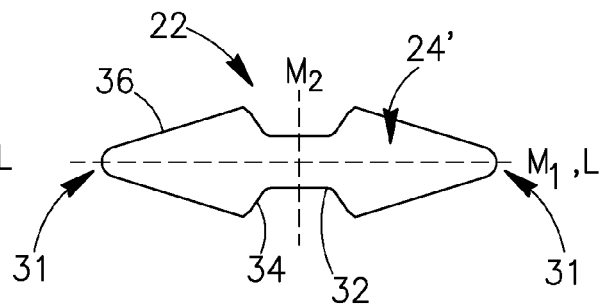
FIG.09  FIG.10
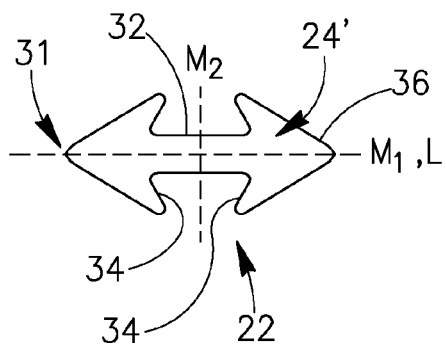 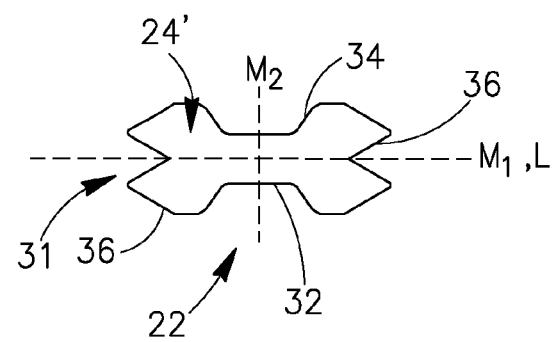
FIG.11  FIG.12
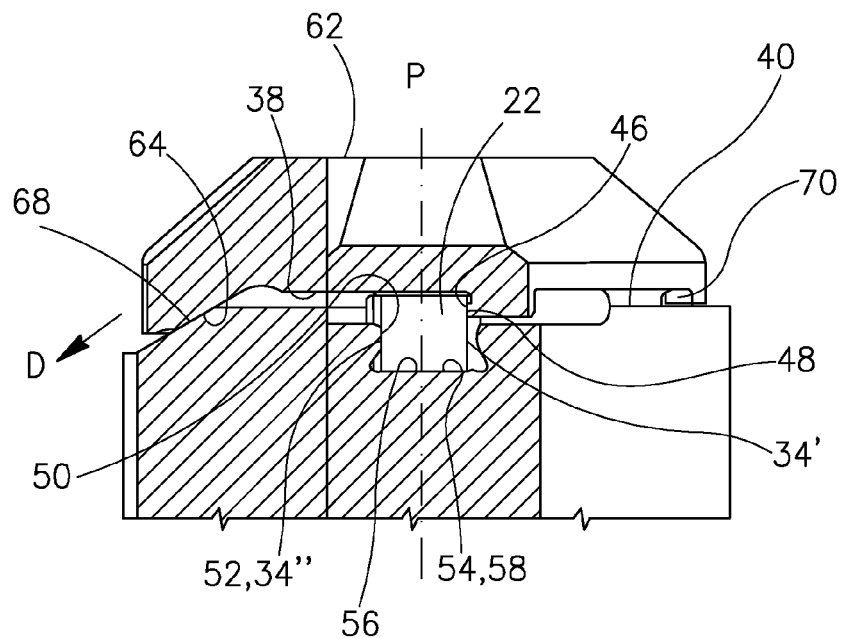
FIG.13

TOOL HOLDER HAVING A TOOL BODY AND TOP CLAMP FOR RETAINING A CUTTING INSERT

RELATED APPLICATIONS

This is a Divisional of U.S. patent application Ser. No. 12/783,993, filed May 20, 2010, now abandoned, which claims priority to IL 199285, filed Jun. 1, 2009. The contents of the aforementioned applications are incorporated by reference in their entirety.

FIELD OF THE INVENTION

The present invention relates to a cutting insert for performing metal cutting operations, and to a cutting tool therefor.

BACKGROUND OF THE INVENTION

Some metal cutting operations are performed using a cutting insert which has at least a cutting edge that is coated with, or made of, a superhard material, for example, a superabrasive material, e.g., Polycrystalline Diamond (PCD) or Cubic Boron Nitride (CBN). This kind of cutting insert may be used, for example, for machining very hard metals, superalloys, or the like, while providing the machined work-piece with appropriate surface quality, and/or obtaining other desired results.

In some instances, due to the high cost of superhard materials such as superabrasives, the cutting insert is assembled, for example, from two separate components: a cutting insert body and a cutting tip. The cutting insert body is formed, for example, of a material used for manufacturing ordinary cutting inserts, for example, cemented carbide such as Tungsten carbide, and the cutting tip, which is significantly smaller in size than the cutting insert body, is formed of a superabrasive material such as PCD or CBN. A pocket is formed in an end of the cutting insert body and the cutting tip is brazed to the pocket, or positioned therein using other methods.

However, the above-described manufacture of a cutting insert may be prolonged and expensive. Also, the assembling of a cutting insert from two separate components may result in manufacture imprecisions that reduce the cutting quality of the cutting insert. In addition, the cutting tip may undesirably become detached or torn from the cutting insert body, either partially or entirely, for example, due to extensive use of the cutting insert and/or due to a poor assembling thereof.

SUMMARY OF THE INVENTION

In some embodiments of the invention, a cutting tool includes a cutting tool holder and a cutting insert. The cutting tool holder has a cutting tool body and a cutting insert clamp, henceforth referred to as a "top clamp", attached thereto using a securing member received in a through-bore formed in a central portion of the top clamp. The cutting tool body has an insert pocket formed at a front end thereof, having the cutting insert releasably retained therein. The top clamp secures the cutting insert in the insert pocket, for example, when the securing member is fastened.

In some embodiments, the cutting insert includes only imperforated surfaces, i.e., in some embodiments the cutting insert does not include any clamping bore for receiving therein clamping components such as a screw, a pin or a lever to clamp the cutting insert in the insert pocket. The cutting insert may have unitary, one-piece construction and be made of superhard material, for example, superabrasive material such as Cubic Boron Nitride (CBN) or Polycrystalline Diamond (PCD). The cutting insert may be machined out of a planar disc of superabrasive material, e.g., using electro-discharge machining methods.

In some embodiments, the cutting insert is an indexable, double-sided, double-ended cutting insert having a longitudinal axis defining an end-to-end direction of the cutting insert. The cutting insert may have a general shape of a double-headed arrow, e.g., as seen from a top view, and include two identical, opposing top and bottom surfaces, and a peripheral surface extending therebetween. The peripheral surface includes two central surfaces and four intermediate surfaces. Rake surfaces are formed at opposite cutting ends of both the top and bottom surfaces.

The cutting insert is mirror-symmetrical with respect to a first median plane thereof, the first median plane containing the longitudinal axis and extending through the top and bottom surfaces. The two central surfaces are located mirror-symmetrically with respect to the first median plane, and each intermediate surface extends from a respective end of the respective central surface, in a direction away from the first median plane. The central surfaces and the intermediate surfaces are generally perpendicular to the top and bottom surfaces.

In some embodiments, the cutting insert has a second median plane, the second median plane being perpendicular to the first median plane and extending through the top and bottom surfaces and also the two central surfaces. In these embodiments, the cutting insert is mirror-symmetrical also with respect to the second median plane.

In some embodiments, the peripheral surface additionally includes four end surfaces, e.g., four substantially planar end surfaces, each end surface extending from a respective intermediate surface in the direction of the first median plane, and forming respective cutting corners thereat. In other embodiments, the peripheral surface may alternatively include two end surfaces, e.g., two curved end surfaces, located mirror-symmetrically with respect to the second median plane, extending between two respective intermediate surfaces on the same side of the second median plane. In yet other embodiments, the peripheral surface may include other end surfaces, e.g., based on specific design and/or cutting requirements of the cutting insert.

In some embodiments, the top clamp may have a generally triangular shape, e.g., as seen from a top view. The top clamp includes a bottom surface, facing an upper surface of the cutting tool body. In some embodiments, the top clamp has a generally asymmetrical shape. A single sliding surface of the top clamp inclinedly protrudes down from a first rear corner of the top clamp, slidingly engaging a complementary shaped sloping surface of the cutting tool body. Thus, as the securing member is fastened, the sliding surface slides against the sloping surface in a direction away from the first median plane, downward and rearward.

In some embodiments, the top clamp includes two engagement surfaces, to respectively engage the cutting insert, e.g., exclusively, in two engagement regions. The top clamp includes, for example, a top engagement surface, formed at a front portion of the top clamp's bottom surface, to engage the cutting insert top surface in a top engagement region formed thereon. The top clamp additionally includes an insert-side engagement surface, extending generally perpendicularly downward from the front portion of the top clamp's bottom surface, to engage one of the intermediate surfaces in a side engagement region on the peripheral surface of the cutting insert.

In some embodiments, a supporting boss may project downward from a second rear corner of the top clamp's bottom surface, to solidly engage the upper surface of the tool body, e.g., when the securing member is fastened. The engagement between the supporting boss and the upper surface directs clamping forces applied by the top clamp toward the cutting insert, resulting in increased, solid securing of the cutting insert in the insert pocket. In a fastened position, the top clamp may exclusively engage the cutting tool body through the sliding surface and the supporting boss.

In addition, in a fastened position the cutting insert engages the insert pocket in three spaced apart engagement regions of three respective intermediate surfaces, to provide solid engagement between the cutting insert and the insert pocket, e.g., without over-constraining the position of the cutting insert in the insert pocket.

In some embodiments, an imaginary plane extends through the top clamp, passes through the top engagement surface and includes a central axis of the through-bore. Due to the asymmetric structure of the top clamp, the single sliding surface is entirely positioned on one side of the imaginary plane, and the supporting boss and the insert-side engagement surface are positioned entirely on the opposite side thereof.

In some embodiments, the geometry of the cutting insert beneficially results in that the body of the cutting insert is relatively small in volume with respect to the cutting regions or cutting tips of the cutting insert. Thus, a cutting insert according to the present invention can be formed, for example, to have unitary one-piece construction and made of superhard material, wherein material is not "wasted" on formation of the body of the cutting insert, e.g., which is not directly involved in the cutting operation. Therefore, the cutting insert is both relatively inexpensive to manufacture, and provided with desired cutting abilities, for example, for adequately performing extensive cutting operations such as cutting of hard metals or superalloys. In addition, the present invention provides an improved securing means for securing the cutting insert of the present invention in a cutting tool holder.

BRIEF DESCRIPTION OF THE DRAWINGS

For a better understanding of the present invention and to show how the same may be carried out in practice, reference will now be made to the accompanying drawings, in which:

FIG. 9 is a top view of a cutting insert in accordance with yet other embodiments of the invention;

FIG. 10 is a top view of a cutting insert in accordance with yet other embodiments of the invention;

FIG. 11 is a top view of a cutting insert in accordance with yet other embodiments of the invention;

FIG. 12 is a top view of a cutting insert in accordance with yet other embodiments of the invention; and FIG. 13 is a cross section view of the cutting tool shown in FIG. 5, taken along the line XIII-XIII in FIG. 5, in accordance with some embodiments of the invention.

Figure 1:
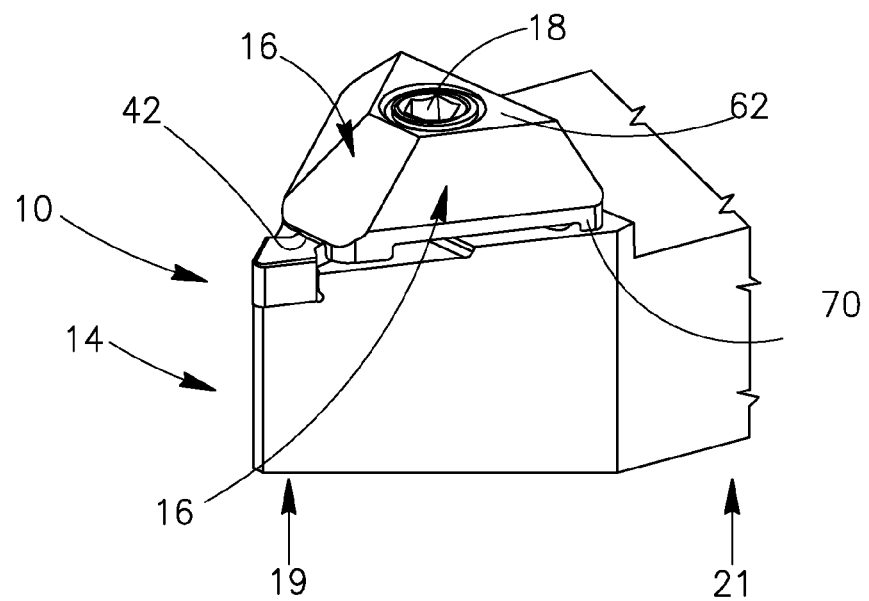
FIG. 1 is a perspective view of a front end of a cutting tool, which includes a top clamp for securing a cutting insert in a cutting tool holder, in accordance with some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show a turning tool, the present invention is not limited in this respect. For example, embodiments of the invention may refer to other cutting tools, e.g., to milling tools or to other metal cutting tools having one or more cutting inserts releasably retained therein.

Reference is made to FIGS. 1-13, showing a cutting tool 10, and a plurality of portions, components and sections thereof, in accordance with a plurality of embodiments of the invention.

Figure 2:
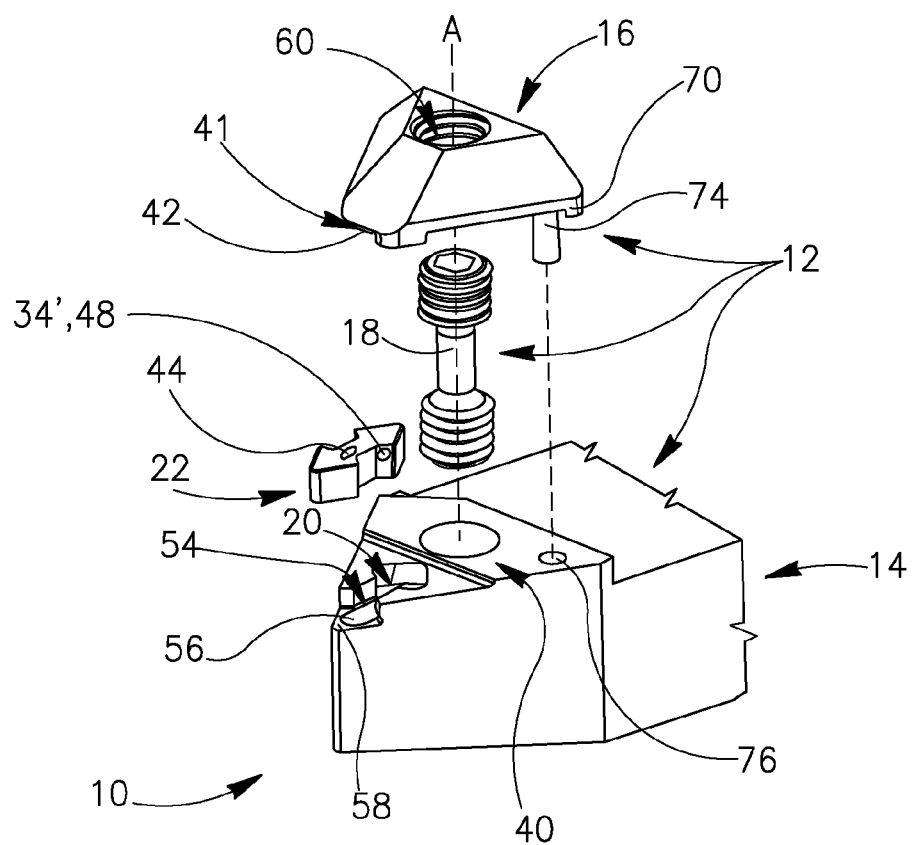
FIG. 2 is an exploded perspective view of the cutting tool of FIG. 1, in accordance with some embodiments of the invention.

In some embodiments, the cutting tool 10 includes a cutting tool holder 12, having a cutting tool body 14 and a cutting insert clamp 16, henceforth referred to as "top clamp 16". The top clamp 16 is attached to the cutting tool body 14 using a securing member 18, for example, a screw having two opposite threads at respective ends thereof, e.g., as shown in FIG. 2, or other appropriate securing means. The cutting tool 10 has a front end 19 and a rear end 21. The cutting tool body 14 includes an insert pocket 20 formed at the front end 19, the insert pocket 20 having a cutting insert 22 releasably retained therein. The top clamp 16 secures the cutting insert 22 in the insert pocket 20, e.g., as described in detail below.

Figure 6:
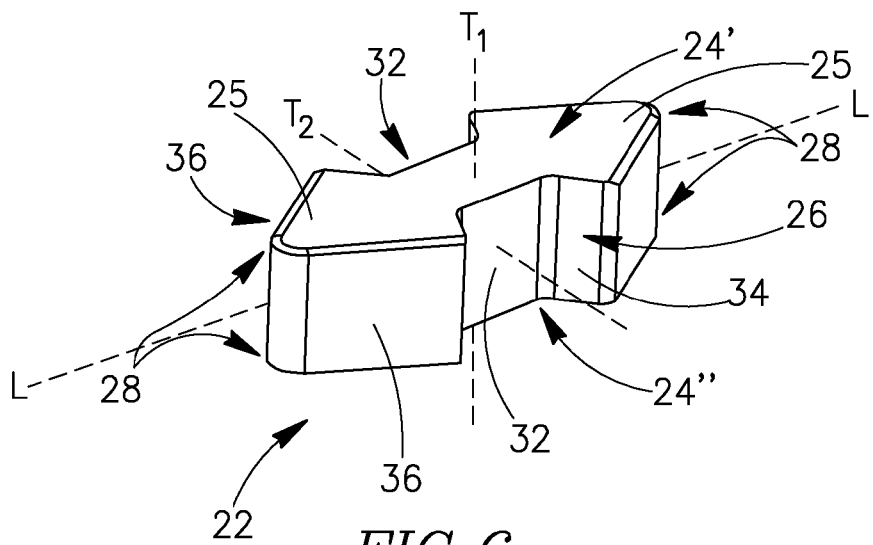
FIG. 6 is a perspective view of the cutting insert of FIG. 1, in accordance with some embodiments of the invention.

In some embodiments, e.g., as shown in FIG. 6, the cutting insert 22 is an indexable, double-sided double-ended cutting insert having a longitudinal axis L defining an end-to-end direction of the cutting insert. The cutting insert 22 has identical top and bottom surfaces, 24', 24", respectively. Each top and bottom surface comprises at least two spaced apart rake surfaces 25 formed at opposite cutting ends 31 of the insert 22. The cutting insert 22 additionally includes a peripheral surface 26 extending between the top and bottom surfaces 24', 24". The top and bottom surfaces 24', 24" and the peripheral surface 26 are imperforated, i.e., the cutting insert 22 does not include any clamping bore for receiving therein a clamping component such as a screw, pin or lever, and thus is devoid of any such clamping bores.

In some embodiments, the cutting insert 22 has unitary, one-piece construction and is formed of superhard material, for example, a superabrasive material such as Cubic Boron Nitride (CBN) or Polycrystalline Diamond (PCD). The cutting insert 22 may be cut, or machined, out of a larger planar disc of superabrasive material, e.g., using electro-discharge machining methods or other methods.

Figure 7:
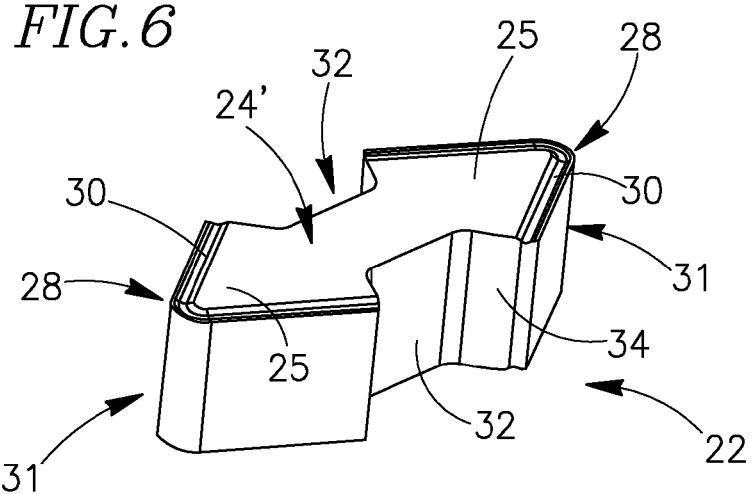
FIG. 7 is a perspective view of a cutting insert, in accordance with other embodiments of the invention.

The cutting insert 22 may have four cutting corners 28, e.g., one cutting corner 28 associated with each rake surface 25, respectively. Thus, the cutting insert 22 is 180 degrees indexable about a first axis $T_1$, and 180 degrees indexable about a second axis $T_2$, e.g., as shown in FIG. 6. The rake surfaces 25 may include one or more grooves 30 formed thereon, e.g., as shown in FIG. 7, each groove 30 associated with a respective cutting corner 28. The grooves 30 may function as chip formers for regulating chip flow during a cutting operation.

In some embodiments, the cutting insert 22 is mirror-symmetrical with respect to a first median plane $M_1$ thereof, the first median plane $M_1$ extending longitudinally through the cutting insert 22, containing the longitudinal axis L, extending through the top and bottom surfaces 24', 24" and passing through the cutting corners 28. In some embodiments, the cutting insert 22 includes a second median plane $M_2$ that extends through the top and bottom surfaces 24', 24" and perpendicularly to the first median plane $M_1$ and includes the first and second axes $T_1$ and $T_2$. In these embodiments, the cutting insert 22 is in addition mirror-symmetrical with respect to the second median plane $M_2$, e.g., as shown in FIGS. 8-12.

Figure 8:
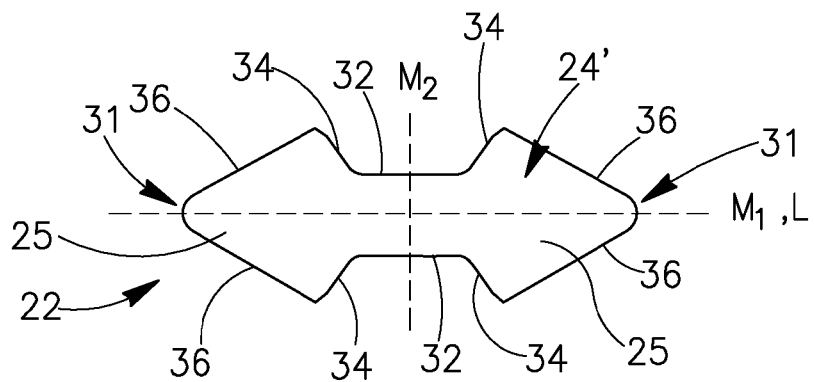
FIG. 8 is a top view of the cutting insert of FIG. 1, in accordance with some embodiments of the invention.

In some embodiments, the peripheral surface 26 includes two central surfaces 32, located mirror-symmetrically with respect to the first median plane $M_1$ and halved, for example, by the second median plane $M_2$, which extends through the two central surfaces in addition to the top and bottom surfaces. The central surfaces 32 may either be planar, and thus parallel to each other, or assume other, appropriate shapes. The peripheral surface 26 additionally includes four intermediate surfaces 34, wherein each intermediate surface 34 extends from a respective end of the respective central surface 32 in a direction away from the first median plane $M_1$. In some embodiments, the intermediate surfaces 34 extend from the respective central surfaces 32 away also from the second median plane $M_2$, e.g., as shown in FIGS. 8-10 and in FIG. 12. In other embodiments, the intermediate surfaces 34 extend from the respective central surfaces 32 toward the second median plane $M_2$, e.g., as shown in FIG. 11. The central surfaces 32 and the intermediate surfaces 34 may be generally perpendicular to the top and bottom surfaces 24', 24".

In some embodiments, the peripheral surface 26 additionally includes four end surfaces 36, the end surfaces 36 extending from respective intermediate surfaces 34 toward the first median plane $M_1$, forming respective cutting corners 28 thereat. In other embodiments, the peripheral surface 26 may alternatively include two end surfaces, e.g., two curved end surfaces 36, located on opposite sides of the cutting insert 22 with respect to the second median plane $M_2$, and extending between two respective intermediate surfaces 34, e.g. as shown in FIG. 9. In yet other embodiments, the peripheral surface 26 may include other end surfaces.

In some embodiments, the top clamp 16 has a generally triangular shape, e.g., as seen from a top view. The top clamp 16 includes a bottom surface 38, which may be planar, facing an upper surface 40 of the cutting tool body 14. The top clamp 16 has a generally asymmetrical structure, such that in a secured position, for example, the top clamp 16 exclusively engages the cutting insert 22 in two engagement regions, as described in detail below.

The top clamp 16 includes an engagement member 41 located on the front portion 75 of the bottom surface 38 and protruding down therefrom, the engagement member 41 including a top engagement surface 42, for engaging the cutting insert 22 in a top engagement region 44 thereof, which is formed on the top surface 24'. The top engagement surface 42 is lower with respect to the bottom surface 38, and may be generally planar, e.g., extending generally parallel to the bottom surface 38, or assume other appropriate shapes for engaging the cutting insert's top surface 24'.

The top clamp 16 additionally includes an insert-side engagement surface 46, also extending generally perpendicularly downward from the front portion 75 of the bottom surface 38, to engage the cutting insert 22 in a side engagement region 48 formed on a side intermediate surface 34' of the intermediate surfaces 34, e.g., as shown in FIG. 2. The side intermediate surface 34' only engages the insert-side engagement surface 46, and does not engage the insert pocket 20, e.g., as shown in FIG. 13.

Figure 3:
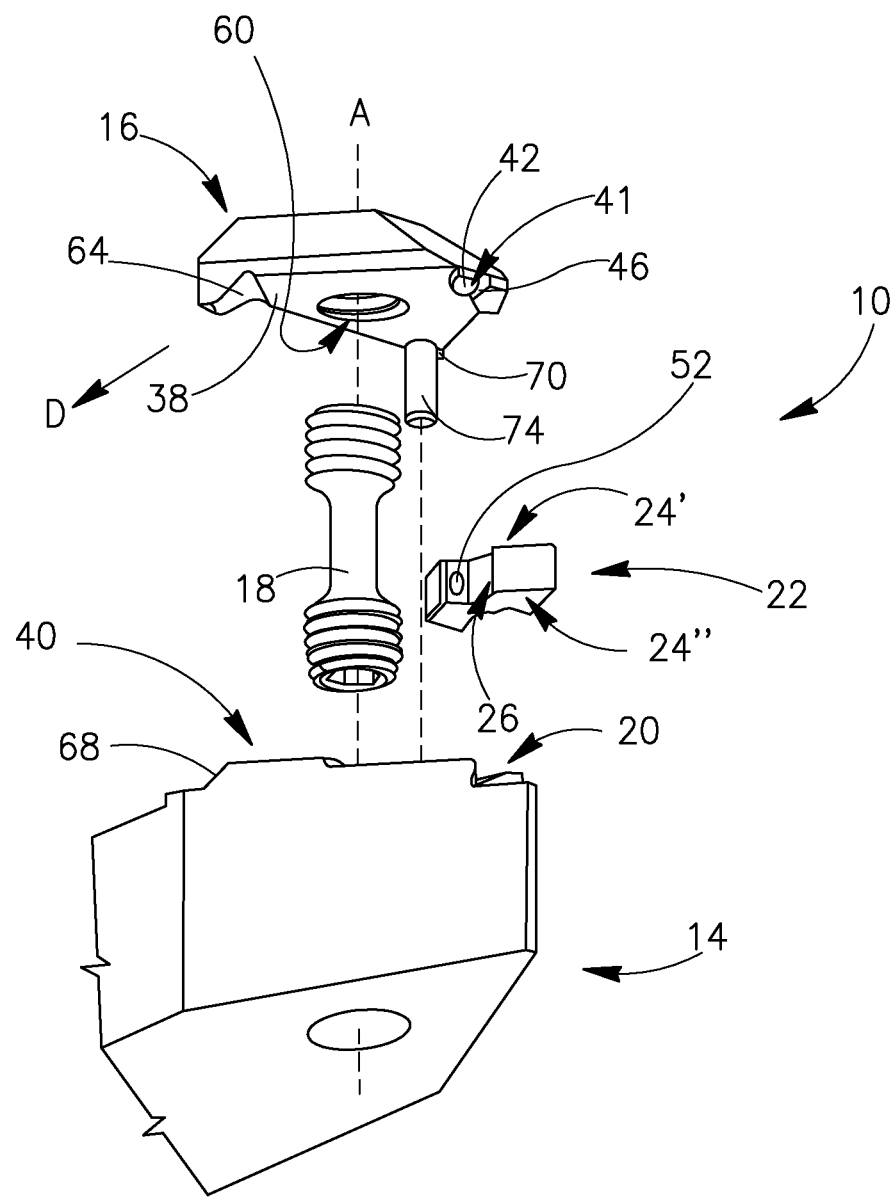
FIG. 3 is another exploded perspective view of the cutting tool of FIG. 1, in accordance with some embodiments of the invention.
Figure 4:
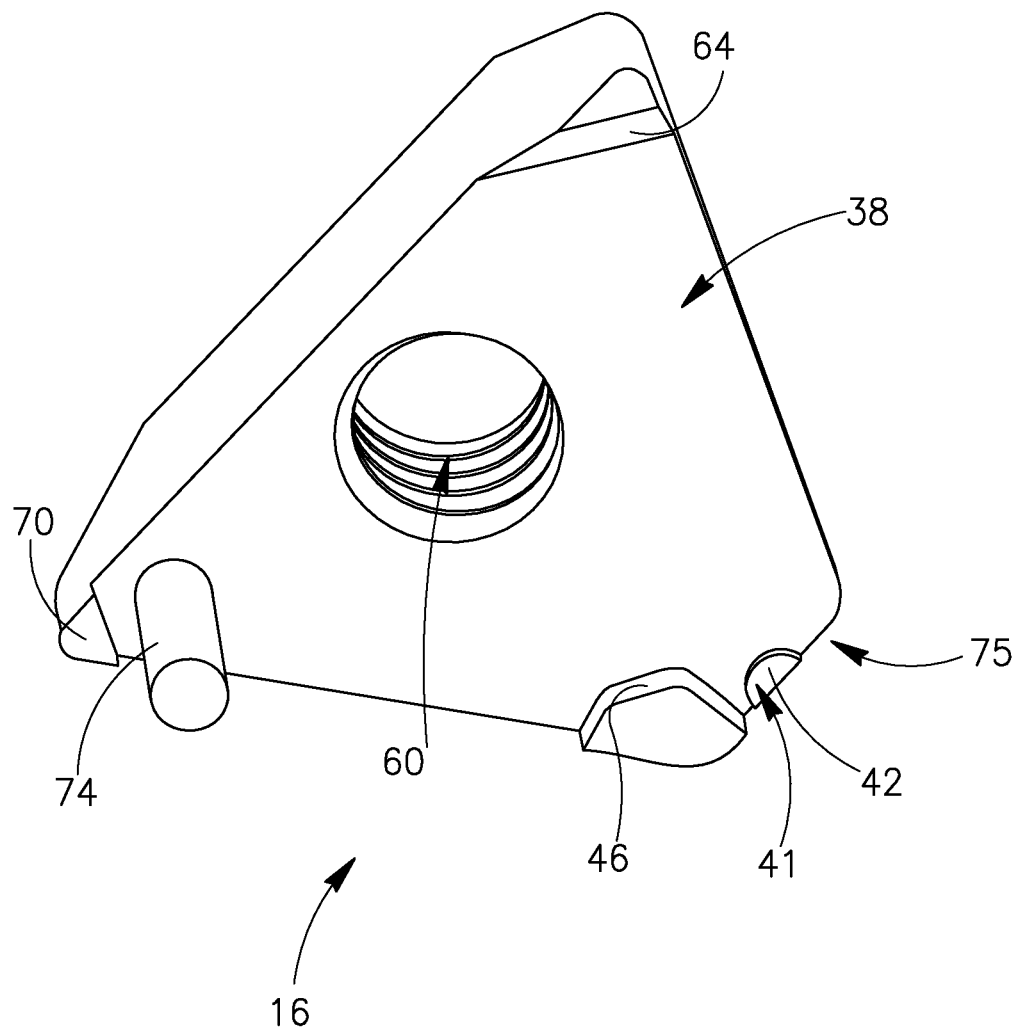
FIG. 4 is a bottom perspective view of the top clamp of FIG. 1.
Figure 5:
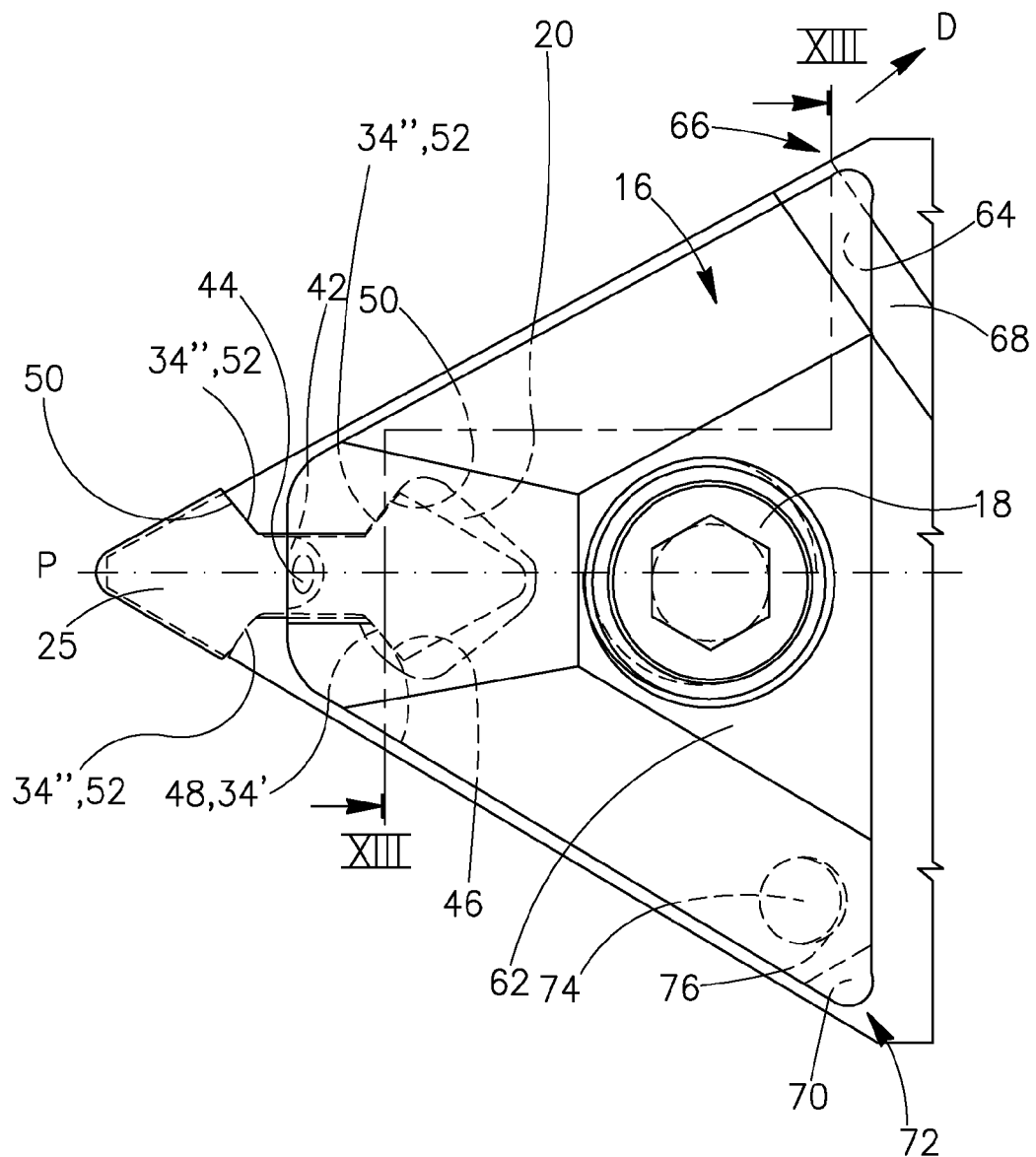
FIG. 5 is a top view of the cutting tool of FIG. 1, in accordance with some embodiments of the invention.

In some embodiments, the insert pocket 20 and the cutting insert 22 are at least partially complementarily shaped. The insert pocket 20 includes three spaced apart pocket walls 50 formed therein, for engaging the peripheral surface 26 of the cutting insert 22. In a secured position, for example, three pocket intermediate surfaces 34" of the intermediate surfaces 34 respectively engage the three pocket walls 50 at three pocket engagement regions 52 of the three pocket intermediate surfaces 34", e.g., as shown in FIGS. 3, 5 and 13. Thus, in a secured position, the peripheral surface 26 engages the insert pocket 20 at three spaced apart pocket engagement regions 52, wherein in some embodiments, e.g., due to the geometry of the cutting insert 22 and insert pocket 20, no two of the three pocket engagement regions 52 are coplanar. This provides solid securing of the cutting insert 22 in the insert pocket 20.

The top, side, and pocket engagement regions, 44, 48 and 52, respectively, are shown in some drawings herein to have a generally elliptical shape. This shape has been chosen for illustrative purposes only, and the engagement regions 44, 48 and 52 are not limited in this respect. For example, illustrations of the engagement regions 44, 48 and 52 may not refer to any physical structure formed on surfaces of the cutting insert 22, and are only be used to indicate the locations of respective regions of engagement between the surfaces associated therewith. In addition, the engagement regions 44, 48 and 52 on the cutting insert 22 may each assume any convenient shape, e.g., based on the specific geometries of the respective associated engagement surfaces.

In some embodiments, the bottom surface 24" engages a supporting surface 54 of insert pocket 20. The supporting surface 54 may include a central recess 56 that does not engage the bottom surface 24", thereby the bottom surface 24" engages only an outer surface 58 of the supporting surface 54, e.g., in order to avoid over-constrained engagement between the cutting insert 22 and the insert pocket 20.

The top clamp 16 additionally includes a through-bore 60, for example, a threaded through-bore, formed in a generally central portion of the top clamp 16, and opening out to the bottom surface 38 and to a clamp upper surface 62 of the top clamp 16, to receive the securing member 18 therein. An imaginary plane P which extends through the top clamp passes through the top engagement surface 42 and includes a central axis A of the through-bore 60.

In some embodiments, the top clamp 16 includes a single sliding surface 64, which inclinedly extends from a first rear corner 66 of the bottom surface 38 in a direction D, i.e., in a direction away from the imaginary plane P, rearward and downward; the direction D shown, for example, in FIGS. 3, 5 and 13. A sloping surface 68 of the cutting tool body, shaped complementarily to the sliding surface 64, facing the sliding surface 64 and located substantially underneath thereto, slopes from the upper surface 40, in the direction D. Thereby, fastening of the securing member 18 results in sliding of the sliding surface 64 against the sloping surface 68, in the direction D. The sliding of the sliding surface 64 in this direction results in fastening of the top clamp 16 to the cutting insert 22 through the top and side engagement regions 44 and 48, respectively, and thus in fastening of the cutting insert 22 to the insert pocket 20 through the pocket engagement regions 52.

In some embodiments, the top clamp 16 includes a supporting boss 70, projecting downward from a second rear corner 72 of the bottom surface 38, to solidly engage the upper surface 40 of the cutting tool body 14. Due to the asymmetric structure of the top clamp 16, the single sliding surface 64 is entirely positioned on one side of the imaginary plane P, and the supporting boss 70 and insert-side engagement surface 46 are entirely positioned on the opposite side thereof.

When fastening the securing member 18, for example, engagement between the supporting boss 70 and the upper surface 40 directs clamping forces, applied by the top clamp 16, toward the front portion 75 of the top clamp's bottom surface 38 where the top engagement surface 42 abuts the top engagement region 44 of the cutting insert 22. This is so, for example, since engagement between the supporting boss 70 and the upper surface 40 results in the upper surface 40 exerting an upward normal force on the top clamp 16. Due to arrangement of the supporting boss 70 and the sliding surface 64 on opposite sides of the imaginary plane P and securing member 18, the applied normal force results in the top clamp 16 increasedly forcing the cutting insert 22 in the direction D.

In some embodiments, the top clamp 16 may additionally include a shaft 74, e.g., a cylindrical shaft, extending down from the bottom surface 38 and received into a corresponding bore 76 formed in the cutting tool body 14. The shaft 74 may protrude downward from the bottom surface 38, for example, more considerably than other components extending downward from the bottom surface 38. The shaft 74 guides the top clamp 16 into position, e.g., in a specific direction and orientation with respect to the cutting tool body 14, for example, after indexing or replacing the cutting insert 22. The bore 76 has a larger diameter than diameter of the shaft 74. Thereby, in a secured position, the shaft 74 is not involved in securing of the cutting insert 22.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool holder, comprising:
a cutting tool body having an insert pocket formed at a front end thereof for releasably receiving a cutting insert therein, an upper surface, and a sloping surface; and
a top clamp releasably connected to the cutting tool body for securing a cutting insert in the insert pocket, wherein the top clamp comprises:
a through-bore for receiving therein a securing member to secure the top clamp to the cutting tool body, the through-bore having a central axis;
a bottom surface having a front portion, a first rear corner and a second rear corner;
an inclined sliding surface formed at the first rear corner, for slidingly engaging the sloping surface of the tool body;
a top engagement surface formed at the front portion, for engaging a top surface of a cutting insert;
an insert-side engagement surface extending downwardly at the front portion, for engaging a peripheral surface of a cutting insert; and
a supporting boss projecting downwardly from the second rear corner, for engaging the upper surface of the tool body and directing clamping forces to the front portion; wherein:
an imaginary plane (P) which extends through the top clamp, passes through the top engagement surface and includes the central axis of the through-bore, divides the top clamp such that the sliding surface is entirely located on one side of the imaginary plane (P), and the supporting boss and the insert side engagement surface are entirely located on an opposite side of the imaginary plane (P).

2. The cutting tool holder of claim 1, further comprising:
a shaft extending downwardly from the bottom surface of the top clamp; and
a bore formed in the cutting tool body, wherein:
the shaft is received into the bore.

3. The cutting tool holder of claim 1, wherein:
the top clamp contacts the cutting tool body at only:
the inclined sliding surface formed at the first rear corner, and
the supporting boss projecting downwardly from the second rear corner.

4. The cutting tool holder of claim 1, in combination with a cutting insert releasably retained in the insert pocket.

5. The cutting tool holder and cutting insert combination of claim 4, wherein:
the top clamp contacts the cutting insert at only:
a top engagement region formed on a top surface of the cutting insert; and
a side engagement region formed on a peripheral surface of the cutting insert.

6. The cutting tool holder and cutting insert combination of claim 5, wherein:
the cutting insert's peripheral surface comprises four intermediate surfaces;
the side engagement region is formed on a first intermediate surface of the peripheral surface; and
three other intermediate surfaces of the peripheral surface engage, in three respective pocket engagement regions thereof, three respective pocket walls of the insert pocket, wherein no two of the three pocket engagement regions are coplanar.

7. The cutting tool holder and cutting insert combination of claim 5, wherein the cutting insert is devoid of a clamping bore.

8. The cutting tool holder and cutting insert combination of claim 4, wherein:
the cutting insert is double-sided and double-ended, having a longitudinal axis defining an end-to-end direction of the cutting insert, the cutting insert being devoid of a clamping bore and comprising:
top and bottom surfaces and a peripheral surface extending therebetween, each top and bottom surface comprising at least two spaced apart rake surfaces formed at opposite cutting ends thereof, wherein:
the cutting insert is mirror-symmetrical with respect to a longitudinally extending first median plane of the cutting insert, the first median plane containing the longitudinal axis and extending through the top and bottom surfaces;

the peripheral surface comprises two central surfaces and four intermediate surfaces;

the two central surfaces are located mirror symmetrically with respect to the first median plane;

each intermediate surface extends from one of the central surfaces in a direction away from the first median plane; and the central surfaces and the intermediate surfaces are generally perpendicular to the top and bottom surfaces.

9. The cutting tool holder and cutting insert combination of claim 8, wherein the cutting insert is mirror-symmetrical with respect to a second median plane of the cutting insert, the second median plane being perpendicular to the first median plane and extending through the top and bottom surfaces and the two central surfaces.

10. The cutting tool holder and cutting insert combination of claim 9, wherein the cutting insert's peripheral surface further comprises four end surfaces, each end surface extending from a respective intermediate surface to the first median plane.

11. The cutting tool holder and cutting insert combination of claim 9, wherein the cutting insert's peripheral surface further comprises two curved end surfaces located on opposite sides of the second median plane and extending between two respective intermediate surfaces.

12. The cutting tool holder and cutting insert combination of claim 8, wherein each of the cutting insert's rake surfaces comprises at least one chip former formed thereon.

13. The cutting tool holder and cutting insert combination of claim 8, wherein the cutting insert has unitary one-piece construction and is made of superabrasive material.

14. The cutting tool holder and cutting insert combination of claim 13, wherein the superabrasive material comprises Cubic Boron Nitride (CBN).

15. The cutting tool holder and cutting insert combination of claim 13, wherein the superabrasive material comprises Polycrystalline Diamond (PCD).

16. A top clamp releasably connectable to a cutting tool body for securing a cutting insert in an insert pocket of the cutting tool body, the top clamp comprising:

a through-bore for receiving therein a securing member to secure the top clamp to the cutting tool body, the through-bore having a central axis;

a bottom surface having a front portion, a first rear corner and a second rear corner;

an inclined sliding surface formed at the first rear corner, for slidingly engaging a sloping surface of the tool body;

a top engagement surface formed at the front portion, for engaging a top surface of a cutting insert;

an insert-side engagement surface extending downwardly at the front portion, for engaging a peripheral surface of a cutting insert; and a supporting boss projecting downwardly from the second rear corner, for engaging the upper surface of the tool body and directing clamping forces to the front portion; wherein:

an imaginary plane (P) which extends through the top clamp, passes through the top engagement surface and includes the central axis of the through-bore, divides the top clamp such that the sliding surface is entirely located on one side of the imaginary plane (P), and the supporting boss and the insert side engagement surface are entirely located on an opposite side of the imaginary plane (P).

17. The top clamp according to claim 16, further comprising a shaft extending downwardly from the bottom surface.

* * * * *